Patented Jan. 1, 1946

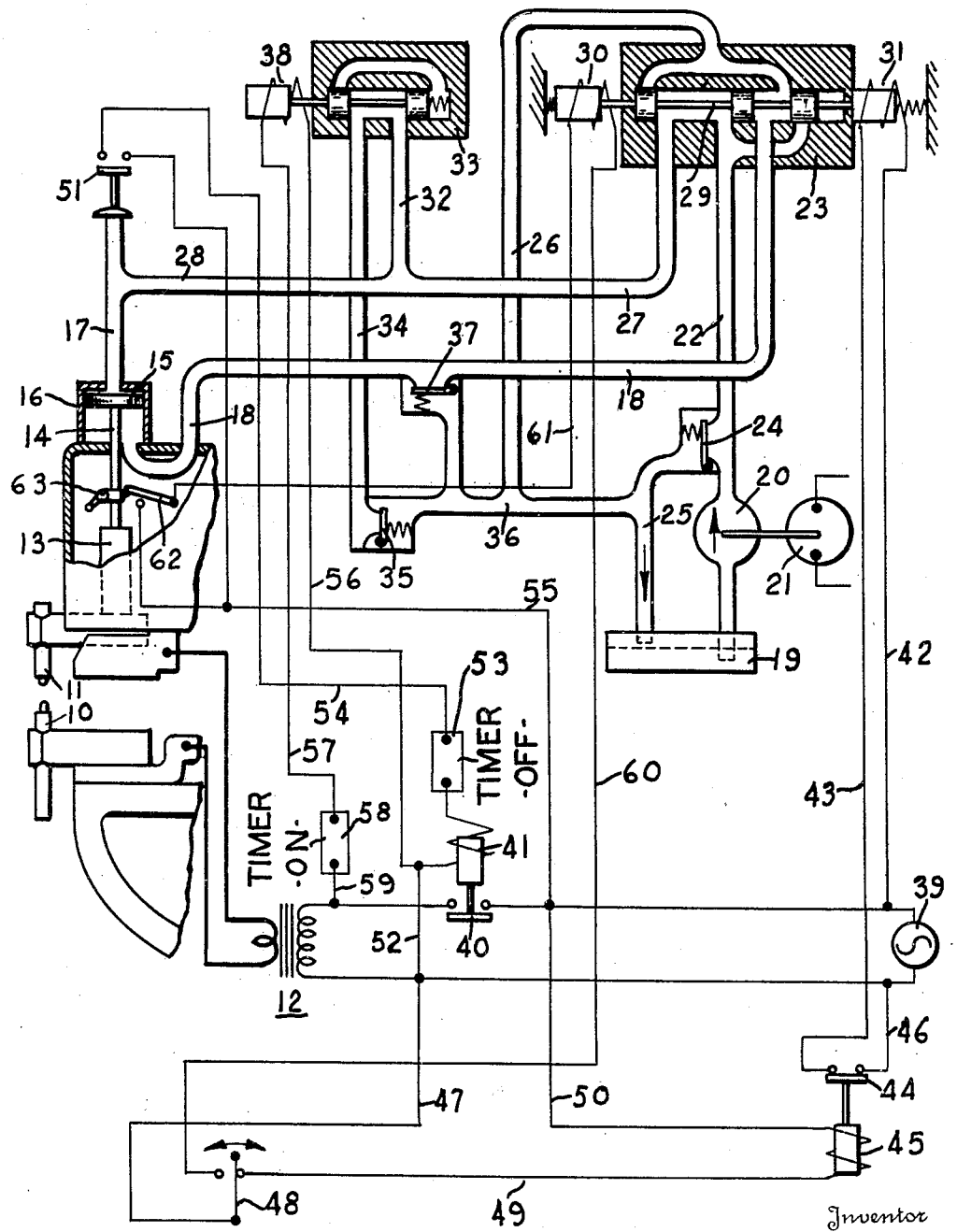

2,392,296

UNITED STATES PATENT OFFICE 2,392,296

ACTUATING SYSTEM FOR WELDING ELECTRODES AND THE LIKE

Melvin M. Seeloff, Warren, Ohio, assignor to The Taylor-Winfield Corporation, Warren, Ohio, a corporation of Ohio Application April 13, 1944, Serial No. 530,907

5 Claims. (Cl. 219—4)

This invention relates to an actuating system for welding electrodes and the like and more particularly to fluid pressure operated devices which are operative to move and apply pressure through connected devices. The invention is particularly applicable to electric resistance welding machines wherein it is desired to move one of the cooperating pair of welding electrodes toward and away from each other and to apply welding pressure through the same electrode preferably by the same means employed to lend opening or closing movement to the electrode. In systems of this character it is also often desired that the welding pressure applied to the movable electrode be rapidly increased following the completion of a small but accurately measured interval of time following the appearance of a reference condition as, for example, the initiation of the flow of the welding current. In order that maximum benefit may be obtained from the application of the second or higher pressure it is essential that the pressure transition be completed in a very short interval of time and heretofore the inertia of the moving parts as well as the starting friction between certain of the moving parts and the fixed parts of the complete assembly has precluded the attainment of the objective.

The primary object of the present invention is the provision of an actuating system for a welding electrode and the like which is operative to move a movable element and to apply pressure therethrough during the first part of a cycle of operation and to thereafter increase such pressure but which, nevertheless, is effective to raise the pressure suddenly and in a minimum period of time while yet providing an effective control over the ultimate pressure exerted. This object is accomplished by the invention by providing in the primary actuating means an inherent arrangement for exerting, upon actuation of the controls for raising the pressure, an initial large force in compensation of the active forces resulting from the inertia and starting friction of the parts as explained above.

A more specific object of the invention is the provision in a fluid pressure actuating system for a welding electrode and the like of a simple arrangement whereby at any desired time during the pressure cycle a momentary excessive fluid pressure may be applied to the fluid pressure motor to rapidly increase the pressure exerted through the electrode or other connected element after which such pressure is automatically maintained at its desired value. In accordance with the preferred embodiment of the invention this more specific object of the invention is accomplished by employing hydraulic fluid as the movement and pressure transmitting medium and by providing a closed circulatory system in which fluid under predetermined pressure may be circulated while in pressure transmitting relation with the fluid motor of the system and which is provided with a blocking valve operative to interrupt such movement of the hydraulic fluid column so that the inertia of a portion of said column may be translated into effective pressure at the motor in opposition to the inertia and starting friction of the moving parts of the motor.

The above and other specific objects and advantages of the invention will become apparent upon consideration of the following detailed specification and the accompanying drawing wherein there is completely disclosed a preferred embodiment of the invention.

The single figure of the drawing is a schematic representation of an electric resistance spot welding machine constructed in accordance with the principles of the invention and in which reference numerals 10 and 11 designate normally fixed and movable welding electrodes, respectively, which are arranged to be electrically connected to the secondary winding of a welding transformer 12. Electrode 11 is carried by a slide 13 connected through rod 14 to a piston 15 contained within cylinder 16. A conduit 17 connects with the upper end of the cylinder 16 while a conduit 18 connects with the lower end thereof so that upon fluid pressure entering these conduits alternately the piston 15 and consequently the electrode 11 will be moved up or down and the electrode brought into pressure engagement with the work as will be understood.

Hydraulic fluid is preferably employed and I provide a source of such fluid under pressure comprising a sump 19, and a pump 20 driven by a motor 21. A supply conduit 22 connects the outlet port of the pump 20 with the inlet port of a four-way valve 23 and interposed in the conduit 22 is a pressure relief valve 24 which operates upon the fluid in conduit 22 attaining a predetermined high pressure to valve excess fluid back to the sump 19 through a return conduit 25. Valve 23 is provided with an outlet port which is connected through conduit 26 to the return main 25. Also provided on the valve 23 are other further ports one of which is connected through the series conduits 27 and 28 with the conduit 17 leading to the upper end of the cylinder 16 while the other of which is connected to the conduit 18 leading to the lower end of cylinder 16. Within the body of valve 23 is a core 29 adapted to be moved in one direction by a solenoid 30 and in the other direction by a solenoid 31. With neither solenoid energized core 29 is centered by the springs shown and conduits 18 and 27 are closed off to lock the fluid in and about the cylinder 16 while conduit 22 is connected with conduit 26 to provide an unrestricted return to the sump 19 of the fluid delivered by the pump 20. Energization of solenoid 31 moves core 29 to the left into the position in which it is shown in the drawing and in this position conduit 22 is connected with conduit 27 to apply fluid pressure to the upper side of piston 15 to thereby move the piston and electrode 11 downwardly.

Communicating with the passage through conduits 27, 28 at their point of juncture is a conduit 32 leading to the inlet port of a balanced valve 33 and extending from the outlet port of said valve is a conduit 34 opening through a pressure relief valve 35 and a conduit 36 to the return main 25. Normally the movable core in the valve 33 is spring biased to the position shown in the drawing so that the initial fluid pressure exerted through the conduit 28 is determined by the setting of the pressure relief valve 35. In practice, relief valve 35 is set to open at a materially lower pressure than the pressure required to open the relief valve 24. Thus, valve 24 may be set so that 900 lbs./sq. in. may be developed in conduit 22 while valve 35 may be adjusted to allow a maximum of 300 lbs./sq. in. in conduit 34. A pressure relief valve 37 usually adjusted for a materially lower pressure may be placed in conduit 18 in the manner shown in the drawing. Valve 33 is arranged to be actuated by a solenoid 38 which, when energized, is operative to block the passage which connects conduit 34 with conduit 32.

For illustration purposes I have shown the transformer 12 as being energizable from an alternating current source 39 through the contactor 40 having an actuating coil 41. Relay 31 is arranged to be energized to move core 29 to the position shown in the drawing by a circuit leading from one terminal of the source 39 through conductors 42 and 43, contactor 44 having an actuating coil 45, and a conductor 46. Coil 45 is arranged to be energized from the source 39 through conductor 47, switch 48, and conductors 49 and 50. While switch 48 is shown as being of the manual type it should be understood that in actual practice suitable automatic sequencing means will normally be employed to initiate the cycle of operation. Also, in accordance with usual practice, means is provided to withhold energization of the welding transformer 12 until proper initial welding pressure is attained and for this purpose a pressure responsive switch 51 is inserted in series in the energizing circuit for the coil 41, the circuit being traceable from source 39 through conductor 52, coil 41, a timer 53 which is operative to disrupt the circuit a predetermined time after its energization, conductor 54, switch 51, and conductor 55 back to the other terminal of the source 39. Thus upon closure of the electrodes 10 and 11 onto the work and the application of appropriate welding pressure through the electrode 11 welding current flows and continues to flow for a period determined by the setting of the timer 53.

To effect an increase in the pressure exerted by the piston 15 on the work through the electrode 11 at a predetermined time following the initiation of flow of the welding current I provide an energizing circuit for the coil 38 comprising in series conductor 52, conductor 56, coil 38, conductor 57, a timing device 58, and conductor 59. It should be observed that conductors 52 and 59 are connected to opposite terminals of the primary winding of transformer 12 so that the circuit does not tend to become energized unless and until contactor 40 is closed. Timing device 58 may be of any suitable construction which is operative upon the expiration of a predetermined time interval to reduce the impedance sufficiently to permit proper actuation of the solenoid 38. Upon the solenoid 38 being actuated conduit 32 is abruptly blocked so that movement of the body or column of fluid which had been flowing from pump 20 through conduit 22, valve 23 and conduit 27 is also abruptly terminated. The inertia of this body or column of fluid tends to drive the fluid into the conduit 28 with the result that the fluid pressure in the conduits 28 and 17 as well as in the cylinder 16 above the piston 15 is suddenly raised to a high value and such momentary high pressure is advantageously utilized in overcoming the inertia and starting friction of the slide 13, rod 14 and piston 16 whereby the desired high effective pressure at the electrode 11 is very rapidly attained. The ultimate pressure exerted by the piston 15 is, of course, determined by the setting of the relief valve 24.

In the embodiment illustrated the opening of contactor 40 results in the de-energization of the solenoid 38 so that the period of the application of the higher pressure cannot begin or continue after the period of welding current flow although it should be understood that with suitable and obvious circuit modifications the timed energization of solenoid 38 both as regards the time of the beginning of the energization and the total time length of the energization may be made independent of the continued energization of the welding transformer. Upon completion of the welding cycle electrode 11 may be retracted back to its initial position shown in the drawing by moving switch arm 48 to the left to energize solenoid 30 through the circuit—source 39, conductor 47, switch 48, conductor 60, solenoid 30, conductor 61, normally closed switch 62, and conductor 55 back to the source 39. Energization of solenoid 30 moves the valve core 29 far to the right to thereby connect conduit 22 with conduit 18 to supply fluid under pressure to the bottom end of cylinder 16. At this time conduit 27 leading from the upper end of cylinder 16 is connected with the sump through conduits 26 and 25. As the piston 15 approaches the upper end of its stroke an operator 63 carried by rod 14 opens switch 62 thereby de-energizing solenoid 30 and allowing valve core 29 to center. The consequent closing of conduit 18 at valve 23 seals the fluid in the lower part of cylinder 16 and the electrode 11 will remain in upper position.

It should now be apparent that I have provided an improved hydraulic actuating system for welding electrodes and the like which accomplishes the objects initially set out. At the start of a cycle of operation, instigated by the closure of switch 48 to energize coil 45, hydraulic fluid under predetermined pressure as controlled by the setting of the relief valve 35 is applied to the top side of the piston 15 to effect a predetermined pressure between the welding electrodes. Such predetermined pressure is maintained until such time following the initiation of flow of the welding current as the circuit or device 58 requires to reach the end of its preselected period. At this instant valve 33 is closed abruptly and the body or column of hydraulic fluid which had been moving through the conduit 22, valve 23, and conduit 27 is abruptly stopped. However, the kinetic energy inherent in this moving column of fluid tends to maintain the column in motion and since such tendency is resisted by the fluid in conduits 17, 28 as well as in the cylinder 16 above the piston 15 the pressure of the fluid in the top part of the cylinder will be abruptly increased. The rapid rate of rise and the magnitude of this increased pressure overcomes to a great extent the resistance to rapid increase in pressure at the electrodes due to the inertia and starting friction of the slide 13, piston 15, etc. so that an effective increase in pressure is developed at the electrodes almost simultaneously with the timing out of the period by the device 58. The intensity of the pressure surge may, of course, be readily diminished or increased by varying the relative lengths of the conduits 27 and 28 as will be well understood. Following application of the surge pressure the static pressure applied to the electrodes is determined by the setting of the relief valve 24.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In an electric resistance welding machine having a pair of welding electrodes adapted to be moved relatively toward each other the combination of means to effect movement of at least one of said electrodes and to apply welding pressure therethrough comprising a hydraulic fluid motor connected with said electrode, a source of hydraulic fluid under pressure, a conduit adapted to connect said source with said motor whereby said motor may be actuated and maintained actuated to apply an initial welding pressure, a discharge conduit connected with said first mentioned conduit intermediate said source and motor but at a point spaced substantially from said source along said first mentioned conduit, a normally open valve and a pressure loaded relief valve in series in said discharge conduit whereby hydraulic fluid under pressure as determined by the loading of said relief valve may move through a substantial portion of said first mentioned conduit and through said discharge conduit, and power operated means to quickly close said normally open valve whereby the kinetic energy of the hydraulic fluid under movement in said first mentioned conduit may be translated into a pressure surge in said motor to increase the pressure exerted by said electrodes.

2. In an electric resistance welding machine having a pair of welding electrodes adapted to be moved relatively toward each other the combination of means to effect movement of at least one of said electrodes and to apply welding pressure therethrough comprising a hydraulic fluid motor connected with said electrode, a source of hydraulic fluid under predetermined maximum pressure, a conduit adapted to connect said source with said motor whereby said motor may be actuated and maintained actuated to apply an initial welding pressure, a discharge conduit connected with said first mentioned conduit intermediate said source and motor at a point spaced substantially from said source along said first mentioned conduit, a normally open valve and a pressure loaded relief valve in series in said discharge conduit whereby hydraulic fluid under pressure as determined by the loading of said relief valve may move through a substantial portion of said first mentioned conduit and through said discharge conduit, and power operated means to quickly close said normally opened valve, said predetermined maximum pressure being higher than the pressure required to actuate said relief valve whereby the pressure exerted by said motor through said electrode may be rapidly increased.

3. In an electric resistance welding machine having a pair of welding electrodes adapted to be moved relatively toward each other the combination of means to effect movement of at least one of said electrodes and to apply welding pressure therethrough comprising a hydraulic fluid motor connected with said electrode, a source of hydraulic fluid under predetermined maximum pressure, a conduit adapted to connect said source with said motor whereby said motor may be actuated and maintained actuated to apply an initial welding pressure, a discharge conduit connected with said first mentioned conduit intermediate said source and motor but at a point spaced substantially from said source along said first mentioned conduit, a normally open valve and a pressure relief valve in series in said discharge conduit whereby hydraulic fluid under pressure as determined by the loading of said relief valve may move through a substantial portion of said first mentioned conduit, power operated means to quickly close said normally open valve, and timing means operative at a predetermined time following the initiation of welding current flow to said electrodes to actuate said valve closing means.

4. In an electric resistance welding machine having a pair of welding electrodes adapted to be moved relatively toward each other the combination of means to effect movement of at least one of said electrodes and to apply welding pressure therethrough comprising a hydraulic fluid motor connected with said electrode, means applying hydraulic fluid under a predetermined initial pressure to said motor, and means to abruptly increase the pressure of the hydraulic fluid furnished said motor comprising means providing a path for a moving column of hydraulic fluid and means diverting said path into said fluid motor whereby the kinetic energy of said moving column is translated into static pressure in said motor.

5. A machine according to claim 4 further including means to apply a controlled final fluid pressure to said motor immediately following said abrupt increase in pressure, said final pressure being higher than said initial pressure.

MELVIN M. SEELOFF.